O. W. THOMPSON.
GAGE.
APPLICATION FILED JAN. 2, 1918.

1,324,988.

Patented Dec. 16, 1919.

Witnesses:
Robert H. Weir
Arthur W. Carlson

Inventor:
Orville W. Thompson
By Stice & Stice Attys.

UNITED STATES PATENT OFFICE.

ORVILLE W. THOMPSON, OF CHICAGO, ILLINOIS.

GAGE.

1,324,988.  Specification of Letters Patent.  Patented Dec. 16, 1919.

Application filed January 2, 1918. Serial No. 209,946.

*To all whom it may concern:*

Be it known that I, ORVILLE W. THOMPSON, a citizen of the United States, residing at Chicago, in the county of Cook and State of Illinois, have invented certain new and useful Improvements in Gages, of which the following is a description.

My invention belongs to that general class of devices known as gages and particularly gages suitable for low readings, as for example on a low pressure system. The invention has among its objects the production of a device of the kind described that is simple, convenient, durable, compact, efficient and satisfactory for use wherever found applicable. I have shown my invention as applied to a gage for indicating pressure in pounds as well as vacuum in inches. The construction shown is designed to show accurately slight variations in pressure to a certain point and wider variations at higher pressures. The same as shown is also designed to indicate vacuum in the system in inches and small variations, and after a certain point to show a wider range. The invention has particularly among its objects the production of a gage of the kind described in which there is no abnormal strain on the Bourdon spring or indicator actuating mechanism. Other advantages and objects will appear to those skilled in the art from the disclosure herein given.

To this end my invention consists in the novel construction, arrangement and combination of parts herein shown and described and more particularly pointed out in the claims.

In the drawings, wherein like reference characters indicate like or corresponding parts, Figure 1 is a front view of one form of my gage;

Figure 1:
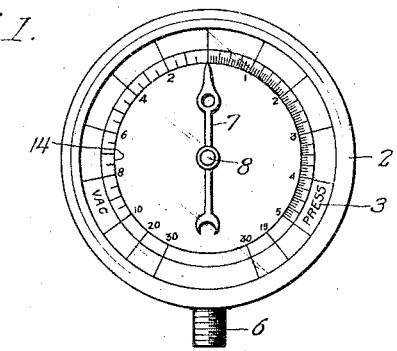

Referring to the drawings, 1 represents a suitable casing over the front of which may be arranged a glass face 3, which is retained in place by the flanged ring 2 or equivalent means for the purpose. Within the casing and spaced from the face 3 is a dial 4, the same being secured in place in any suitable manner. The dial shown is constructed to indicate both pressure and vacuum, pressure up to five pounds in ounces and then fifteen pounds and thirty pounds, and vacuum in inches to ten inches and then twenty and thirty inches. The particular indication, however, is immaterial as this varies as desired and depends on the use for which the gage is designed. Movable over the face of the dial is an indicator or pointer 7 which is mounted on a spindle 8 extending through the dial and connected by suitable mechanism to the Bourdon spring 9.

Figure 2:
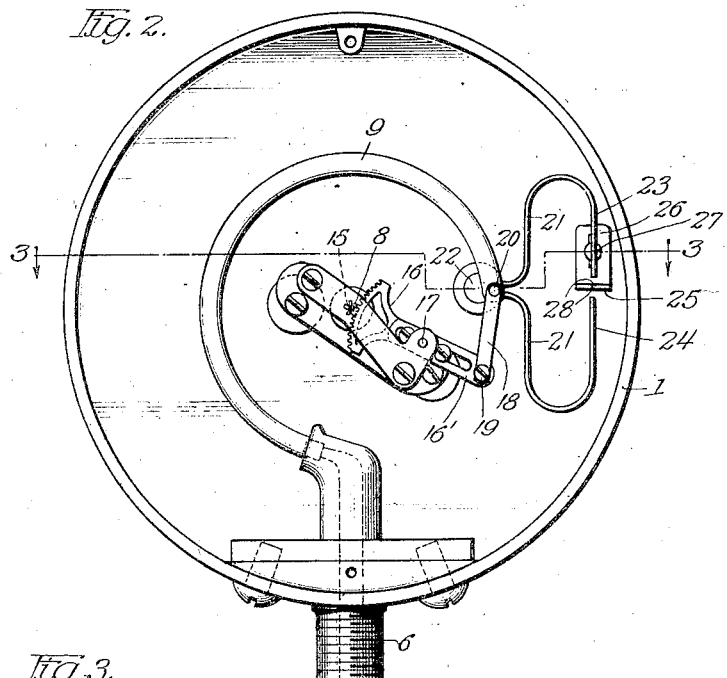
Fig. 2 is a plan view of the same with the dial, pointer and glass front removed.
Figure 3:
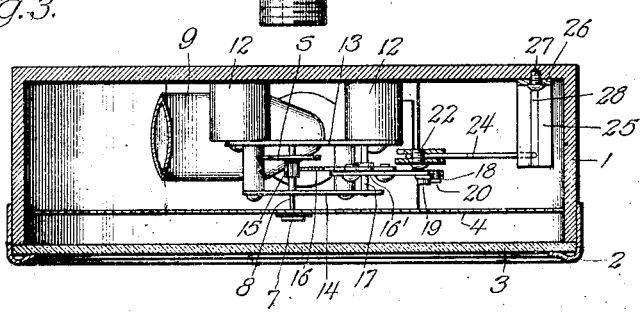
Fig. 3 is a sectional view taken substantially on line 3—3 of Fig. 2.

The Bourdon spring 9 shown in Figs. 2 and 3 is of the well known type and constructed of suitable material, and according to the proper design or formula to give the results which may be desired. The spring 9 is connected with the pipe or nipple 6, by means of which the gage may be connected in the system. While the particular mechanism shown for connecting the Bourdon spring and indicator spindle 8 forms no part of the present invention, it may be mentioned that 12—12 are posts which carry spaced plates 13 and 14, between which are arranged the pinion 15 on spindle 8 and spring 8. The gear segment 16 pivotally secured at 17 meshes with the pinion 15. Segment 16 is provided with an adjustable extension 16' which is connected by means of a link 18 to the Bourdon spring. As shown, the link is pivotally connected at 19 to the extension arm 16' and at 20 to the Bourdon spring.

Figure 4:
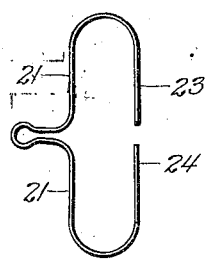
Fig. 4 is a view of the spring which is employed as an auxiliary to the Bourdon spring.

Referring particularly to Figs. 2 and 4, the Bourdon spring 9 carries an auxiliary or supplemental spring 21 which is secured thereto at the end by a screw or bolt 22, or equivalent means for the purpose. The spring 21 is provided with the extending ends 23 and 24, the free ends, however, being separated or spaced in the preferred construction as shown. Carried by the casing is a stop member 25—26 arranged to coöperate with the ends 23 and 24 of the spring. As shown, part 26 is secured to the casing by a screw 27 extended through the slot so that the member may be adjusted as desired. The outwardly turned or spring engaging portion of the part 25—26 is preferably grooved as at 28 on each side at the points where the ends 23—24 will engage therewith when the Bourdon spring is contracted or expanded.

When there is pressure applied to the gage, the Bourdon spring 9 tends to extend or straighten out and through the link 18, etc., or equivalent intermediate mechanism moves the indicator or pointer 7. When a predetermined pressure is reached, however, as for example in the gage illustrated, five pounds, the spring end 24 will engage with the stop 25 and the action of the Bourdon spring 9 will be retarded. That is to say, the end of he Bourdon spring will not move as much as the pressure increases as it did before, and consequently increased pressure will not cause as much movement of the indicator 7. The same is true of the vacuum, as after contraction of the Bourdon spring to a certain point the same will be retarded by the spring 21.

While I have shown a combined pressure and vacuum gage, obviously the construction is applicable for either a pressure or vacuum gage alone. There is no strain on the Bourdon spring whatever, for pressures or vacuum within the limits for which the gage would ordinarily be called on to indicate, nor is there any tendency in the Bourdon spring to set. The instrument may therefore be made extremely delicate and accurately indicate small variations in a certain range of readings. However, for the sake of safety the gage is constructed so that higher readings are indicated. It is only after the pressure or vacuum has reached a predetermined point that the supplemental spring comes into action, at all other times the Bourdon spring acting free and independent.

With my improved construction there is never any danger of the quadrant or part 16 running out of engagement with the pinion 15. It will be noted that when the auxiliary or supplemental spring ends 23 or 24 engage with the stop 25, that the shock and strain is first transmitted directly to the supplemental spring, so that a considerable portion of the same is absorbed before being transmitted to the Bourdon spring. The supplemental spring therefore to a large extent carries the shock as it is intended that it should. The device is therefore extremely flexible and sensitive, although suitable for both high and low readings.

Having thus described my invention, it is obvious that various immaterial modifications may be made in the same without departing from the spirit of my invention, hence I do not wish to be understood as limiting myself to the exact form, construction, arrangement and combination of parts herein shown and described or uses mentioned.

What I claim as new and desire to secure by Letters Patent is:—

1. In a gage, indicating mechanism, a pressure controlled tubular spring and means for operatively connecting said indicating mechanism and spring, in combination with an auxiliary spring carried by said first mentioned spring, and stop means for engaging said auxiliary spring after a predetermined movement thereof to bring said auxiliary spring into action.

2. In a device of the kind described, a casing, and a pressure controlled spring arranged within the casing, in combination with an auxiliary spring carried by the first spring, a stop carried by the casing in the path of movement of the auxiliary spring, said auxiliary spring being normally spaced from the stop, whereby an initial movement of the pressure controlled spring is allowed to a predetermined point, at which point the auxiliary spring will be brought into action by contact with the stop, substantially as described.

3. In a device of the kind described and in combination, a casing, pressure indicating mechanism arranged within the casing, including a pressure controlled spring, an auxiliary spring carried by the pressure spring, a stop adjustably secured to the casing in the path of movement of the auxiliary spring, but normally spaced therefrom, whereby the initial movement of the pressure spring is uninfluenced by the auxiliary spring, but further movement beyond a predetermined point brings the auxiliary spring into action by contact with the stop.

4. In a gage, a casing, indicating mechanism carried thereby, a pressure controlled spring, and means for operating and connecting said indicating mechanism and spring, in combination with a normally inoperative auxiliary spring carried by the pressure spring arranged to retard the operation of the pressure spring after a predetermined movement thereof, and adjustable means carried by said casing arranged in the path of the auxiliary spring to bring it into action.

5. In a gage, a casing, indicating mechanism, a pressure controlled tubular spring, and means for operatively connecting said indicating mechanism and spring, in combination with an auxiliary retarding spring carried by the said tubular spring, and adjustable stop means for engaging said retarding spring after a predetermined movement thereof to bring it into action.

6. In a gage, a casing, indicating mechanism, a pressure controlled tubular spring, and means for operatively connecting said indicating mechanism and spring, in combination with means for retarding the movement of said spring after a predetermined movement thereof, comprising an auxiliary spring carried by the pressure controlled spring at the free end thereof, and stop means carried by the casing for engaging said retarding spring after a predetermined movement thereof to bring it into action.

7. In a device of the kind described, indicating mechanism, a pressure controlled tubular spring, and means for operatively engaging said indicating mechanism and spring, in combination with an auxiliary retarding spring carried on the free end of the tubular spring, and having its free ends extended and brought toward each other to provide a space between them, and an adjustable stop carried by the casing normally positioned between and spaced from the ends of the retarding spring, thus causing the retarding spring to be brought into action at a predetermined point whether said first mentioned spring is operated as a pressure or a vacuum gage.

8. In a gage, a casing, indicating mechanism, a pressure controlled spring, means for operating and connecting said indicating mechanism and spring, in combination with a normally inoperative controlling mechanism including a spring carried by said first named spring for retarding the operation of the pressure controlled spring after a predetermined movement thereof.

In testimony whereof, I have hereunto signed my name in the presence of two subscribing witnesses.

ORVILLE W. THOMPSON.

Witnesses:
Roy W. Hill,
Charles I. Cobb.